United States Patent
McCabe

(10) Patent No.: US 9,232,370 B2
(45) Date of Patent: Jan. 5, 2016

(54) ENHANCED CONVERGED IP MESSAGE SERVER SYSTEM AND METHOD

(71) Applicant: Mavenir Systems, Inc., Richardson, TX (US)

(72) Inventor: Terence Patrick McCabe, Dallas, TX (US)

(73) Assignee: Mitel Mobility Inc., Richardson, TX (US)

( * ) Notice: Subject to any disclaimer, the term of this patent is extended or adjusted under 35 U.S.C. 154(b) by 150 days.

(21) Appl. No.: 14/169,229

(22) Filed: Jan. 31, 2014

(65) Prior Publication Data

US 2014/0222901 A1    Aug. 7, 2014

Related U.S. Application Data

(60) Provisional application No. 61/759,778, filed on Feb. 1, 2013.

(51) Int. Cl.
*G06F 15/16* (2006.01)
*H04W 4/12* (2009.01)
*H04L 29/06* (2006.01)

(52) U.S. Cl.
CPC ............. *H04W 4/12* (2013.01); *H04L 65/1016* (2013.01); *H04L 65/1073* (2013.01)

(58) Field of Classification Search
None
See application file for complete search history.

(56) References Cited

U.S. PATENT DOCUMENTS

| 8,312,094 B2 | 11/2012 | Lee |
| 2009/0213841 A1 | 8/2009 | Masson |
| 2011/0047233 A1 | 2/2011 | Park |

OTHER PUBLICATIONS

Wikipedia, IP Multimedia Subsystem, Jan. 27, 2014, pp. 1-16, http://en.wikipedia.org/wiki/IP_Muitimedia_Subsystem.
Cisco, Cisco Converged Services Platform, 2011, http://www.cisco.com/en/US/prod/collateral/wireless/ps11035/ps11047/ps11073/data_sheet_c78-607158.html.
Mavenir Systems, Converged Messaging, A White Paper from Mavenir Systems, Feb. 2012, http://www.mavenir.com/assets/files/Resources/MavenirConvergedMessagingWhitePaper_022212.pdf.

*Primary Examiner* — Brian P Whipple

(57) ABSTRACT

A method comprises registering, by an enhanced CPM server, to receive IMS registrations for a client device, receiving, by the enhanced CPM server, a message intended for the client device, storing the message in a network store, setting a Message Waiting Indicator flag in a HLR associated with the client device, receiving, from the HLR, an alert message that the client device has registered in a non-IMS network, and delivering, by the enhanced CPM server, at least a reference to the message stored in the network store to the client device.

10 Claims, 2 Drawing Sheets

ENHANCED CONVERGED IP MESSAGE SERVER SYSTEM AND METHOD

RELATED APPLICATION

This application claims the benefit of Provisional Patent Application Ser. No. 61/759,778, entitled "Enhanced Converged IP Message Server System and Method," filed on Feb. 1, 2013.

FIELD

The present disclosure primarily relates to an enhanced Converged IP Message server (CPM) system and method.

BACKGROUND

The 3rd Generation Partnership Project (3GPP) has defined the IP Multimedia Subsystem (IMS) as the service engine or service delivery architecture for next-generation IP networks. The IMS includes a set of network nodes that provide various multimedia services and control calls in a mobile communication network environment. The IMS combines an Internet Protocol (IP) network with the mobile communication environment. Further, under standards developed by Open Mobile Alliance (OMA), there has been a convergence of messaging services called "Converged IP Messaging (CPM) Service" that is a Session Initiation Protocol (SIP)-based service capable of servicing users of conventional Short Message Service (SMS), Multimedia Messaging Service (MMS), and Instant Messaging (IM) services, etc., as well as users of CPM service.

DETAILED DESCRIPTION

Figure 1:
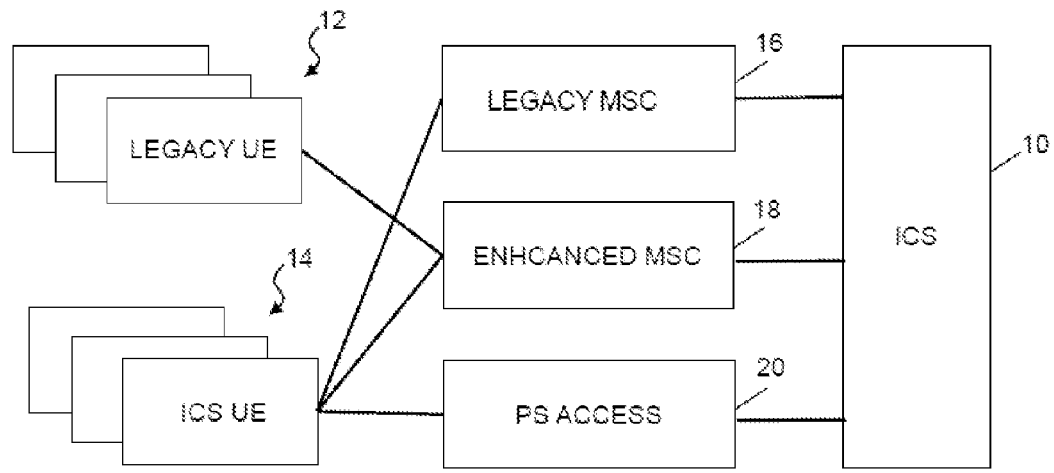
FIG. 1 is a simplified block diagram of an exemplary embodiment of the IMS (IP Multimedia Subsystem) Centralized Services (ICS) architecture 10.

FIG. 1 is a simplified block diagram of an exemplary embodiment of the IMS (IP Multimedia Subsystem) Centralized Services (ICS) architecture 10. 3GPP (3rd Generation Partnership Project) defines IMS as the service engine for next-generation IP (Internet Protocol) networks. ICS enables IMS services for traditional circuit switched (CS) voice access by legacy 2G, 3G, and fixed User Equipment (UE) 12, such as PSTN (Public Switched Telephone Network) and GSM (Global System for Mobile) telephones. With ICS, user sessions are anchored in the IMS network when UEs access via Packet-Switched (PS) access networks 20 or CS access networks, which may be wireless technologies, wireline technologies, and broadband access technologies. For the purpose of the present disclosure, the access technologies may include, for example, radio access technologies selected from IEEE 802.11a technology, IEEE 802.11b technology, IEEE 802.11g technology, IEEE 802.11n technology, GSM/EDGE Radio Access Network (GERAN) technology (both CS and PS domains), Universal Mobile Telecommunications System (UMTS) technology, and Evolution-Data Optimized (EVDO) technology, etc.

The UEs (User Equipment) may be enhanced UEs 14 that support ICS capability, but UEs 12 without ICS capability are also supported by ICS. Broadband access technologies may include wireless local area networks or WLANs, Wi-MAX networks as well as fixed networks such as DSL, cable broadband, etc. With ICS, IMS sessions using CS media bearer are treated as standard IMS sessions for the purpose of service control and service continuity. The 3GPP ICS standard defines signaling mechanisms between the UE and IMS network for service continuity when using Circuit-Switched access for media transport. The UEs may include any electronic device that is capable of interfacing with the above-described networks, such as mobile telephones, a tablet computer, a laptop computer, Google Glasses, a wearable technology device, a GPS device, a Bluetooth device, etc. Such electronic device may also be installed on-board a vehicle or another mobile platform.

The network includes legacy MSC (Mobile Switching Center) servers 16, as well as MSC servers 18 that have been enhanced to support ICS. MSCs enhanced for ICS support both mobile-originated and mobile-terminated calls for ICS UEs 14 (CPM-capable) and non-ICS UEs 12 (non-CPM capable). Enhanced MSC 18 may act as an IMS client for the UE, or via an Intelligent Network (IN) node that communicates with the MSC server via CAP (CAMEL Application Part).

The enhanced CPM system and method described herein is a mechanism to ensure that a subscriber receives timely notification of a Converged IP Message (CPM message) whether that subscriber registers in an IMS network or another mobile network which supports the SMS, MMS, and IM services but not IMS signaling or messaging.

Figure 2:
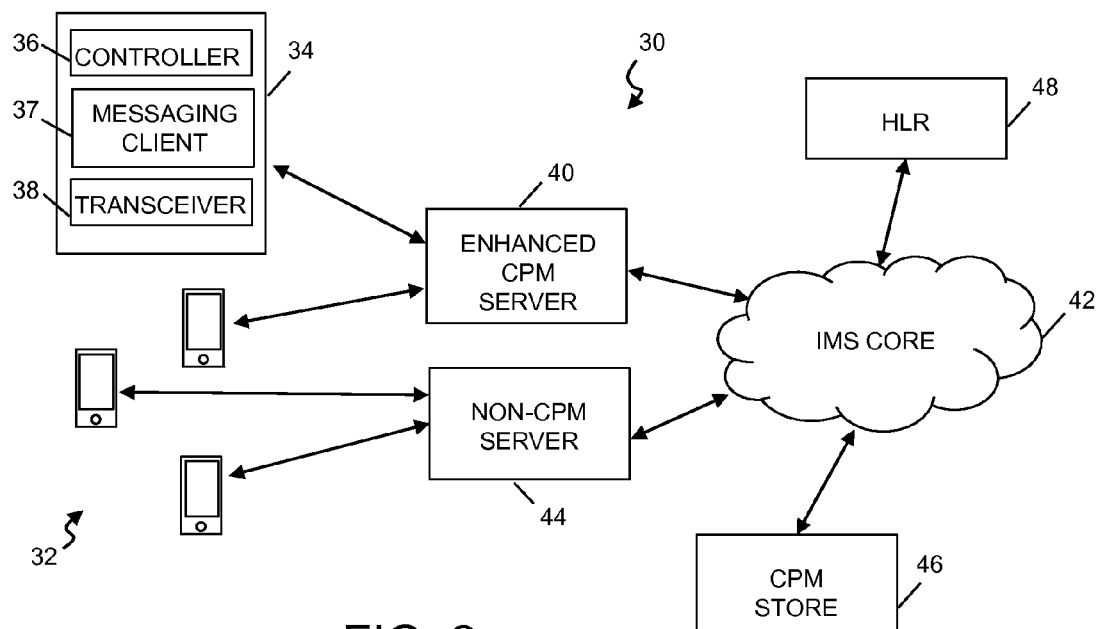
FIG. 2 is an exemplary block diagram of a CPM service system 30 according to the teachings of the present disclosure.

FIG. 2 is an exemplary block diagram of a CPM service system 30 according to the teachings of the present disclosure. A plurality of User Equipment (UEs) 32 may be CPM-capable as well as non-CPM capable. As provided above, the UE 34 is a device or terminal that is capable of accessing the mobile communication network. The UE 34 typically includes a controller 36, a messaging client 37, and a transceiver 38. Not shown explicitly, the UE 34 also may include or is associated with a display to present information to the user, and a user interface for receiving user input. Additional capabilities may include an imaging system that is configured to take a photograph, and/or read a machine-readable code. UE and UE-B are interchangeable terms used herein.

The CPM service system 30 further includes an enhanced CPM server 40 is configured to manage and support CPM messaging service. It is further configured to communicate with the IMS core and other functional entities or network nodes. In addition, non-CPM server 44 is configured to provide message delivery services other than CPM, such as SMS, MMS, and IM. The network further includes a CPM store 46 configured to store data such as CPM messages and other media. Users are able to persistently store and retrieve all messaging history in the network, including all messages, conversations/chats and file transfers. The network also includes a Home Location Register (HLR) 48 that is configured to store subscriber information and authenticate subscribers in a mobile network.

Figure 3:
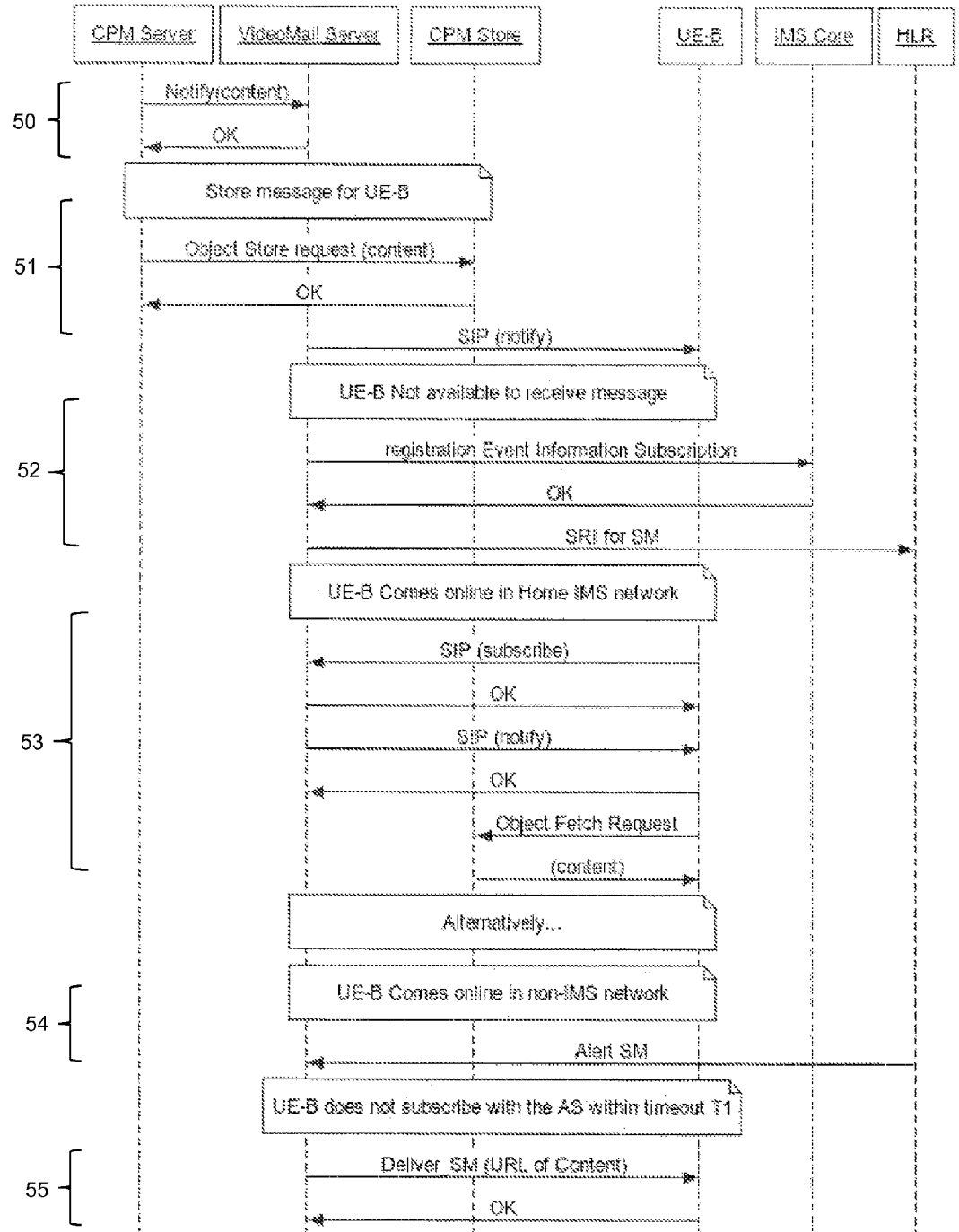
FIG. 3 is a message flow diagram.

Referring to FIG. 3, the CPM server sends a message to the VideoMail server notifying it of message and other content intended for the UE-B, referenced by numeral 50. Referenced by numeral 51, the CPM server may send a message and other content intended for the UE-B client to the CPM store. The CPM store stores the message and other content intended for the UE-B. The VideoMail server is then configured to send a SIP notification message of a new event to the UE-B.

Referenced by numeral 52, the UE-B is not available to receive the message. The CPM (or VideoMail) server sends a registration event information subscription message to the IMS core, and further sets the MWI (Message Waiting Indicator) flag in the HLR of the UE-B through use of the Send Routing Information (SRI) for Short Message SS7 operation as defined in the GSM specifications.

Referenced by numeral 53, if the subscriber subsequently registers in the IMS network then the CPM message is delivered (normal procedure). The UE-B sends a subscribe message to the VideoMail server, which subscribes for an event of notification. The VideoMail server sends a notify message to the UE-B about the pending message in the CPM store. The UE-B then sends an object fetch request to the CPM store, which results in the stored message and other content to be send to the UE-B.

Referenced by numeral 54, if the UE-B comes online in a GSM (2G or 3G network), an alert message is sent by the HLR of the UE-B to the VideoMail server. Further, as referenced by numeral 55, if the UE-B does not subscribe or registers with an Application Server (AS) within a predetermined timeout period, then it is assumed that the subscriber is only reachable over SMS or another non-CPM service. The VideoMail server sends a delivery short message that may contain a pointer, reference, or URL (Uniform Resource Locator) pointing to the CPM message content, allowing the UE-B to retrieve the content using, e.g., a web browser on the mobile device or any other internet connected browser.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A method comprising:
   registering, by an enhanced CPM server, to receive IMS registrations for a client device;
   receiving, by the enhanced CPM server, a message intended for the client device;
   storing the message in a network store;
   setting a Message Waiting Indicator (MWI) flag in a HLR associated with the client device;
   receiving, from the HLR, an alert message that the client device has registered in a non-IMS network; and
   delivering, by the enhanced CPM server, at least a reference to the message stored in the network store to the client device.

2. The method of claim 1, wherein setting the MWI flag in the HLR comprises sending, by the CPM server, a Send Routing Information (SRI) for Short Message SS7 to the HLR.

3. The method of claim 1, wherein delivering at least a reference to the message comprises delivering the stored message to the client device.

4. The method of claim 1, further comprising:
   receiving a subscribe message from the client device;
   sending a notify message to the client device; and
   delivering the message stored in the network store to the client device in response to a fetch request.

5. The method of claim 1, wherein the enhanced CPM server comprises a VideoMail server.

6. A method comprising:
   receiving, by an enhanced CPM server, a message intended for a client device;
   storing the message in a CPM store;
   setting a Message Waiting Indicator (MWI) flag in a HLR associated with the client device;
   receiving, from the HLR, an alert message that the client device has registered in a non-IMS network; and
   delivering at least a reference to the message stored in the network store to the client device.

7. The method of claim 6, wherein setting the MWI flag in the HLR comprises sending, by the CPM server, a Send Routing Information (SRI) message to the HLR.

8. The method of claim 6, wherein delivering at least a reference to the message comprises delivering the stored message to the client device.

9. The method of claim 6, further comprising:
   receiving a subscribe message from the client device;
   sending a notify message to the client device; and
   delivering the message stored in the network store to the client device in response to a fetch request.

10. The method of claim 6, wherein the enhanced CPM server comprises a VideoMail server.

* * * * *